United States Patent
Nakai et al.

(10) Patent No.: US 12,495,149 B2
(45) Date of Patent: Dec. 9, 2025

(54) IMAGE PROCESSING METHOD, IMAGE PROCESSING SYSTEM, IMAGE PROCESSING DEVICE, AND SERVER

(71) Applicant: Panasonic Intellectual Property Management Co., Ltd., Osaka (JP)

(72) Inventors: Kensuke Nakai, Osaka (JP); Kazumasa Motoda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/612,493

(22) Filed: Mar. 21, 2024

(65) Prior Publication Data

US 2024/0236338 A1    Jul. 11, 2024

Related U.S. Application Data

(63) Continuation of application No. PCT/JP2022/028252, filed on Jul. 20, 2022.

(30) Foreign Application Priority Data

Sep. 30, 2021    (JP) .................. 2021-160750

(51) Int. Cl.
*H04N 19/167*    (2014.01)
*G06V 10/26*    (2022.01)
(Continued)

(52) U.S. Cl.
CPC ......... *H04N 19/167* (2014.11); *G06V 10/267* (2022.01); *H04N 19/119* (2014.11);
(Continued)

(58) Field of Classification Search
None
See application file for complete search history.

(56) References Cited

U.S. PATENT DOCUMENTS

| | | |
|---|---|---|
| 5,710,590 A | 1/1998 | Ichige et al. |
| 2005/0175101 A1 | 8/2005 | Honda et al. |

(Continued)

FOREIGN PATENT DOCUMENTS

| | | |
|---|---|---|
| JP | 7-288789 | 10/1995 |
| JP | 2000-50259 | 2/2000 |

(Continued)

OTHER PUBLICATIONS

Office Action issued Mar. 11, 2025 in corresponding European Patent Application No. 22875564.1.

(Continued)

*Primary Examiner* — Nam D Pham
(74) *Attorney, Agent, or Firm* — Wenderoth, Lind & Ponack L.L.P.

(57) ABSTRACT

An image processing method for extracting a subject from an image including the subject using a background image includes: generating a background removed image obtained by removing a background region not including the subject in the image from the image; compressing the background removed image; transmitting the background removed image compressed via a network; receiving the background removed image compressed via the network; decoding the background removed image compressed and received; generating a restored image by synthesizing the background removed image decoded and the background image; and comparing the restored image with the background image to extract the subject.

12 Claims, 7 Drawing Sheets

(51) Int. Cl.
*H04N 19/119* (2014.01)
*H04N 19/136* (2014.01)
*H04N 19/172* (2014.01)
*H04N 19/176* (2014.01)

(52) U.S. Cl.
CPC ......... *H04N 19/136* (2014.11); *H04N 19/172* (2014.11); *H04N 19/176* (2014.11)

(56) References Cited

U.S. PATENT DOCUMENTS

| | | | |
|---|---|---|---|
| 2019/0228565 A1* | 7/2019 | Yushiya | ........... H04N 21/21805 |
| 2019/0303685 A1 | 10/2019 | Nagao | |
| 2020/0020086 A1 | 1/2020 | Kida | |

FOREIGN PATENT DOCUMENTS

| | | |
|---|---|---|
| JP | 2005-203865 | 7/2005 |
| JP | 2005-260912 | 9/2005 |
| JP | 2019-176306 | 10/2019 |
| JP | 2020-14051 | 1/2020 |

OTHER PUBLICATIONS

Wu Lirong et al., "Foreground-Background Parallel Compression With Residual Encoding for Surveillance Video", XP093253235, Sep. 28, 2020.
International Search Report issued Oct. 4, 2022 in International (PCT) Application No. PCT/JP2022/028252.

* cited by examiner

IMAGE PROCESSING METHOD, IMAGE PROCESSING SYSTEM, IMAGE PROCESSING DEVICE, AND SERVER

BACKGROUND

1. Technical Field

The present disclosure relates to an image processing method, an image processing system, an image processing device, and a server.

2. Description of the Related Art

Unexamined Japanese Patent Publication No. 2020-14051 discloses a technique of extracting a subject from an image including the subject using a background image.

There is a need to transmit an image including a subject via a network to cause a device at a transmission destination to execute processing of extracting the subject. Unfortunately, when an image including a subject is transmitted with quality maintained to a device at a transmission destination via a network by using the technique described in Unexamined Japanese Patent Publication No. 2020-14051 mentioned above, a communication load increases. When an image to be transmitted is compressed having the first amount of data to reduce the communication load for this reason, the device at the transmission destination extracts the subject from the compressed image, and thus an extracted image of the subject is deteriorated in image quality more than the subject extracted from the image without compression.

SUMMARY

The present disclosure provides an image processing method and the like capable of suppressing deterioration of an image of a subject due to compression to address the problem mentioned above.

An image processing method according to the present disclosure is for extracting a subject from an image including the subject using a background image, the image processing method including: generating a background removed image obtained by removing, from the image, a background region not including the subject in the image; compressing the background removed image; transmitting the background removed image compressed via a network; receiving the background removed image compressed via the network; decoding the background removed image compressed and received; generating a restored image by synthesizing the background removed image decoded and the background image; and comparing the restored image with the background image to extract the subject.

An image processing system according to the present disclosure extracts a subject from an image including the subject using a background image, the image processing system including an image processing device and a server that are connected to each other via a network, the image processing device including: a first generator that generates a background removed image obtained by removing, from the image, a background region not including the subject in the image; a compressor that compresses the background removed image; and a transmitter that transmits the background removed image compressed via the network, the server including: a receiver that receives the background removed image compressed via the network; a decoder that decodes the background removed image compressed and received; a second generator that synthesizes the background removed image decoded and the background image to generate a restored image; and an extractor that compares the restored image with the background image to extract the subject.

An image processing method according to the present disclosure is performed by an image processing device in an image processing system that includes the image processing device that transmits a compressed image including a subject, and a server that extracts the subject from the compressed image using a background image, the image processing method including: generating a background removed image obtained by removing, from the image, a background region not including the subject in the image including the subject; compressing the background removed image; and transmitting the background removed image compressed to the server via a network.

An image processing device according to the present disclosure is provided in an image processing system that includes the image processing device that transmits a compressed image including a subject, and a server that extracts the subject from the compressed image using a background image, the image processing device including: a generator that generates a background removed image obtained by removing, from the image, a background region not including the subject in the image including the subject; a compressor that compresses the background removed image; and a transmitter that transmits the background removed image compressed via a network.

An image processing method according to the present disclosure is performed by a server in an image processing system that includes an image processing device that transmits a compressed image including a subject, and the server that extracts the subject from the compressed image using a background image, the image processing method including: receiving a background removed image compressed via a network; decoding the background removed image compressed and received; synthesizing the background removed image decoded and the background image to generate a restored image; and comparing the restored image with the background image to extract the subject, the background removed image compressed being obtained by compressing a background removed image obtained by removing, from the image, a background region not including the subject in the image.

A server according to the present disclosure is provided in an image processing system that includes an image processing device that transmits a compressed image including a subject, and the server that extracts the subject from the compressed image using a background image, the server including: a receiver that receives the background removed image compressed via a network; a decoder that decodes a background removed image compressed and received; a generator that synthesizes the background removed image decoded and the background image to generate a restored image; and an extractor that compares the restored image with the background image to extract the subject, the background removed image compressed being obtained by compressing a background removed image obtained by removing, from the image, a background region not including the subject in the image.

These comprehensive or specific aspects may be achieved by a device, a system, a method, an integrated circuit, a computer program, or a recording medium such as a computer-readable CD-ROM, or may be achieved by any combination of the device, the system, the method, the integrated circuit, the computer program, and the recording medium.

The image processing method and the like in the present disclosure can suppress deterioration of an image of a subject due to compression.

DETAILED DESCRIPTION

To solve the problem discussed above, the present inventors have found an image processing method and the like capable of suppressing deterioration of an image of a subject due to compression.

An image processing method according to the present disclosure is for extracting a subject from an image including the subject using a background image, the image processing method including: generating a background removed image obtained by removing, from the image, a background region not including the subject in the image; compressing the background removed image; transmitting the background removed image compressed via a network; receiving the background removed image compressed via the network; decoding the background removed image compressed and received; generating a restored image by synthesizing the background removed image decoded and the background image; and comparing the restored image with the background image to extract the subject.

This method generates the background removed image in which the background region other than the subject is removed from the image, and compresses the background removed image. Thus, the amount of data occupied by a subject region can be increased in proportion in the background removed image compressed. As a result, the amount of data on the background removed image compressed can be reduced almost without reducing the image quality of the subject region transmitted via the network. Thus, deterioration in image quality of the image of the subject extracted at the transmission destination can be suppressed.

The background removed image may be an image after the background region is changed to an image in which a compression ratio during compression is higher than that of a region including the subject in the image.

Thus, the amount of data on the background region of the background removed image can be reduced.

The generating the background removed image may include: extracting a subject region including the subject in the image, cutting out the subject region from the image to generate a subject image; extracting the background region that is a region other than the subject region from the image, changing an image of the background region to have a higher compression ratio during compression than an image of the subject region to generate a background mask image; and superimposing the subject image on the subject region of the background mask image to generate the background removed image.

Thus, the background removed image can be easily generated.

The image may be a frame included in a moving image, and the image processing method may be performed for operations for each frame included in the moving image, the operations including the generating, the compressing, the transmitting, the receiving, and the decoding the background removed image, the generating the restored image, and the extracting the subject.

Thus, deterioration in image quality of the image of the subject extracted for each frame of the moving image by the device at the transmission destination can be suppressed.

The background image may be an uncompressed image or have a smaller compression ratio than the background removed image compressed.

Thus, the background image can have high quality.

The image processing method may be performed by an image processing system including an image processing device and a server that are communicably connected to each other via a network. The image processing device may perform the generating, the compressing, and the transmitting the background removed image, and the server may perform the receiving, and the decoding the background removed image, the generating the restored image, and the extracting the subject.

Thus, deterioration in image quality of the image of the subject extracted by the server at the transmission destination can be suppressed.

Then, a boundary between the background region and the subject region may be set overlapping a block boundary of a block that is a processing unit in the compressing.

Thus, the background removed image can be efficiently compressed.

The background region of the background removed image is constituted of a plurality of pixels that may be substantially equal in pixel value.

Thus, the background removed image can be compressed with the background region having a higher compression ratio during compression than the region including the subject in the image.

An image processing system according to the present disclosure extracts a subject from an image including the subject using a background image, the image processing system including an image processing device and a server that are connected to each other via a network, the image processing device including: a first generator that generates a background removed image obtained by removing, from the image, a background region not including the subject in the image; a compressor that compresses the background removed image; and a transmitter that transmits the background removed image compressed via the network, the server including: a receiver that receives the background removed image compressed via the network; a decoder that decodes the background removed image compressed and received; a second generator that synthesizes the background removed image decoded and the background image to generate a restored image; and an extractor that compares the restored image with the background image to extract the subject.

This method generates the background removed image in which the background region other than the subject is removed from the image, and compresses the background removed image. Thus, the amount of data occupied by a subject region can be increased in proportion in the background removed image compressed. As a result, the amount of data on the background removed image compressed can be reduced almost without reducing the image quality of the subject region transmitted via the network. Thus, deterioration in image quality of the image of the subject extracted at the transmission destination can be suppressed.

An image processing method according to the present disclosure is performed by an image processing device in an image processing system that includes the image processing device that transmits a compressed image including a subject, and a server that extracts the subject from the compressed image using a background image, the image processing method including: generating a background removed image obtained by removing, from the image, a background region not including the subject in the image including the subject; compressing the background removed image; and transmitting the background removed image compressed to the server via a network.

This method generates the background removed image in which the background region other than the subject is removed from the image, and compresses the background removed image. Thus, the amount of data occupied by a subject region can be increased in proportion in the background removed image compressed. As a result, the amount of data on the background removed image compressed can be reduced almost without reducing the image quality of the subject region transmitted via the network. Thus, deterioration in image quality of the image of the subject extracted at the transmission destination can be suppressed.

An image processing device according to the present disclosure is provided in an image processing system that includes the image processing device that transmits a compressed image including a subject, and a server that extracts the subject from the compressed image using a background image, the image processing device including: a generator that generates a background removed image obtained by removing, from the image, a background region not including the subject in the image including the subject; a compressor that compresses the background removed image; and a transmitter that transmits the background removed image compressed via a network.

This method generates the background removed image in which the background region other than the subject is removed from the image, and compresses the background removed image. Thus, the amount of data occupied by a subject region can be increased in proportion in the background removed image compressed. As a result, the amount of data on the background removed image compressed can be reduced almost without reducing the image quality of the subject region transmitted via the network. Thus, deterioration in image quality of the image of the subject extracted at the transmission destination can be suppressed.

An image processing method according to the present disclosure is performed by a server in an image processing system that includes an image processing device that transmits a compressed image including a subject, and the server that extracts the subject from the compressed image using a background image, the image processing method including: receiving a background removed image compressed via a network; decoding the background removed image compressed and received; synthesizing the background removed image decoded and the background image to generate a restored image; and comparing the restored image with the background image to extract the subject, the background removed image compressed being obtained by compressing a background removed image obtained by removing, from the image, a background region not including the subject in the image.

This method enables suppressing deterioration of image quality of the image of the subject extracted at the transmission destination because the subject is extracted using the background removed image compressed while a large proportion of the amount of data occupied by the subject region is maintained.

A server according to the present disclosure is provided in an image processing system that includes an image processing device that transmits a compressed image including a subject, and the server that extracts the subject from the compressed image using a background image, the server including: a receiver that receives a background removed image compressed via a network; a decoder that decodes the background removed image compressed and received; a generator that synthesizes the background removed image decoded and the background image to generate a restored image; and an extractor that compares the restored image with the background image to extract the subject, the background removed image compressed being obtained by compressing a background removed image obtained by removing, from the image, a background region not including the subject in the image.

This method enables suppressing deterioration of image quality of the image of the subject extracted at the transmission destination because the subject is extracted using the background removed image compressed while a large proportion of the amount of data occupied by the subject region is maintained.

These comprehensive or specific aspects may be achieved by a device, a system, a method, an integrated circuit, a computer program, or a recording medium such as a computer-readable CD-ROM, or may be achieved by any combination of the device, the system, the method, the integrated circuit, the computer program, and the recording medium.

Hereinafter, an exemplary embodiment will be described in detail with reference to the drawings as appropriate. Unnecessarily detailed description may not be described. For example, detailed description of well-known matters and duplicated description of a substantially identical configuration may not be described. This is to avoid an unnecessarily redundant description below and to facilitate understanding of those skilled in the art.

The inventors provide the accompanying drawings and the following description for those skilled in the art to fully understand the present disclosure, and do not intend to limit the subject matter described in the scope of claims by the accompanying drawings and the following description.

EXEMPLARY EMBODIMENT

Hereinafter, an exemplary embodiment will be described with reference to FIGS. 1 to 7.

1. Configuration

Figure 1:
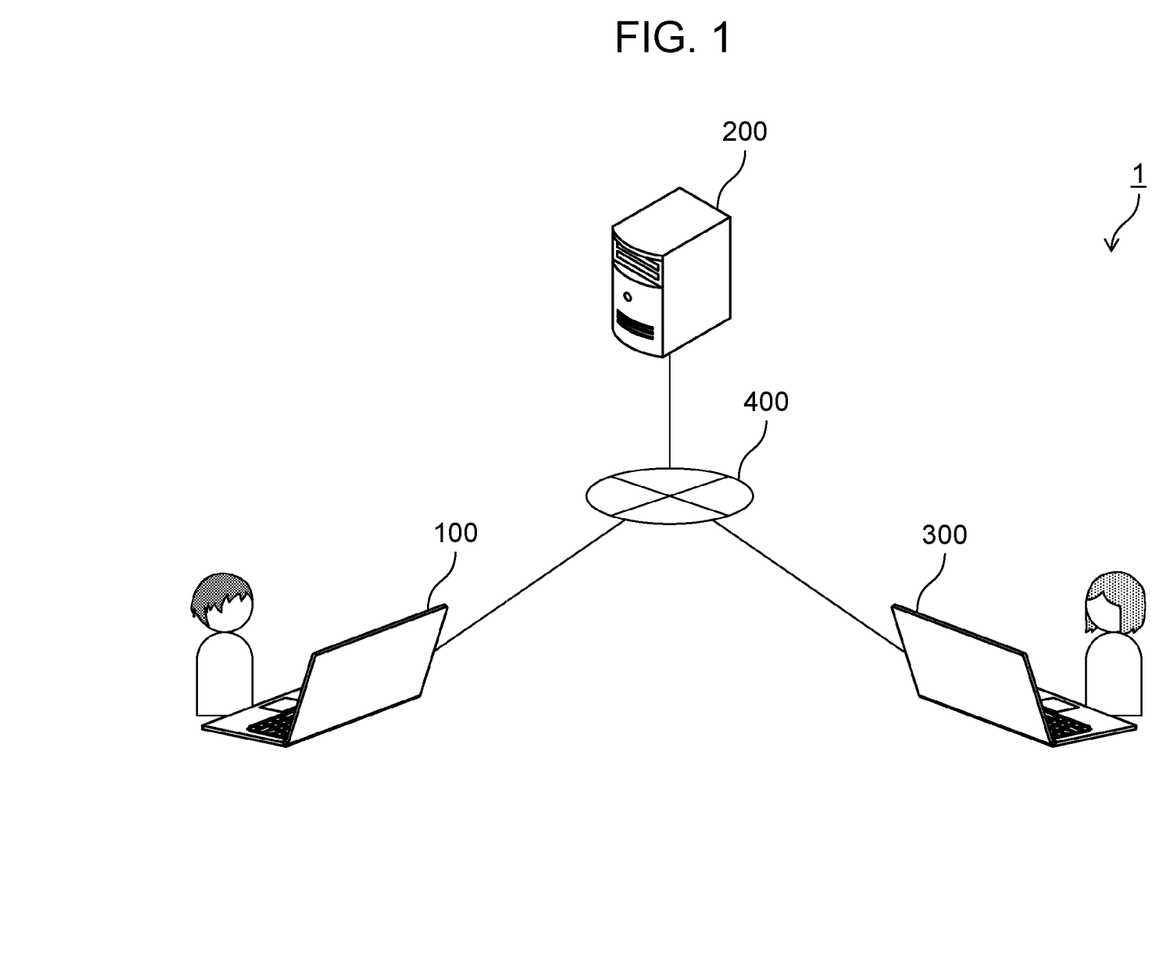
FIG. 1 is a diagram schematically illustrating an image processing system according to an exemplary embodiment.

FIG. 1 is a diagram schematically illustrating an image processing system according to the exemplary embodiment.

Image processing system 1 includes image processing device 100, server 200, and display device 300. Image processing device 100, server 200, and display device 300 are communicably connected via network 400. Image processing device 100 and display device 300 are a personal computer (PC), for example. Image processing device 100 may be a camera that captures a moving image or a still image. Image processing device 100 may have functions of display device 300, and display device 300 may have functions of image processing device 100. Network 400 may be a general-purpose network such as the Internet or a dedicated line, for example.

Figure 2:
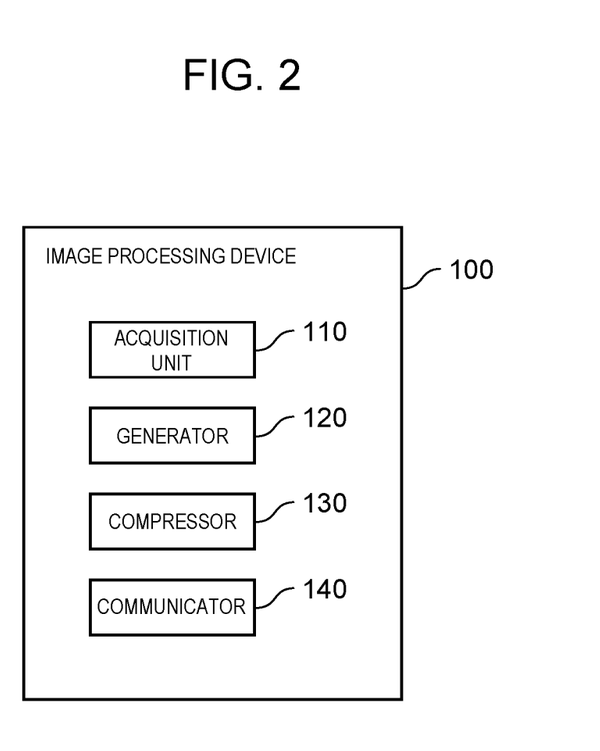
FIG. 2 is a diagram illustrating an example of a functional configuration of an image processing device according to an exemplary embodiment.
Figure 3:
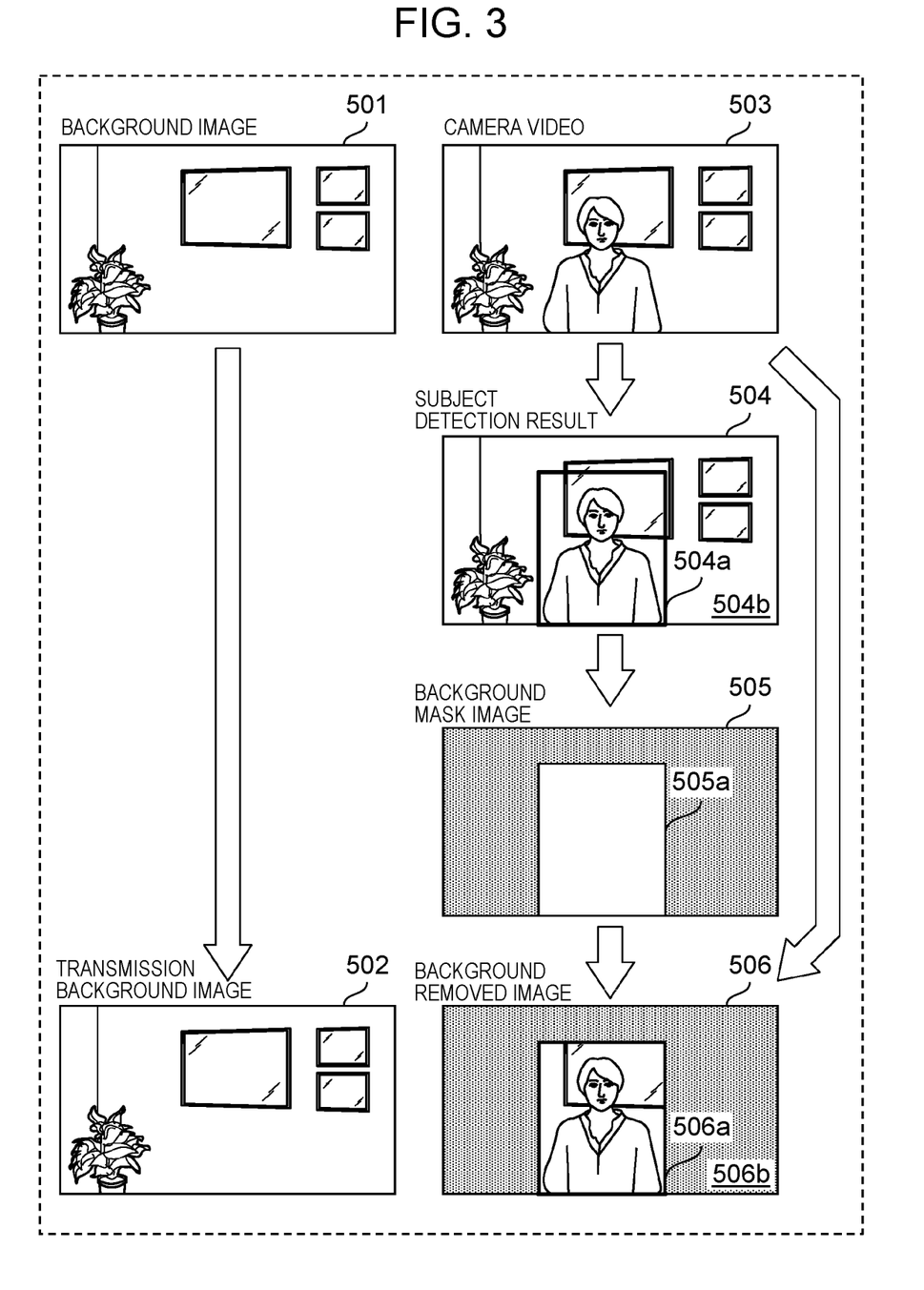
FIG. 3 is a diagram illustrating an example of a functional configuration of a server according to an exemplary embodiment.

FIG. 2 is a diagram illustrating an example of a functional configuration of an image processing device according to the exemplary embodiment. FIG. 3 is a diagram for illustrating processing in the image processing device.

Image processing device 100 includes acquisition unit 110, generator 120, compressor 130, and communicator 140. Functions of image processing device 100 can be implemented by a processor executing a predetermined program using a memory. Each component will be described below.

Acquisition unit 110 acquires camera video 503 that is an image including a subject. Acquisition unit 110 may acquire an image including the subject captured by a camera provided in image processing device 100 as camera video 503, or may acquire an image including the subject captured by a camera connected to an external terminal (communication interface) of image processing device 100 as camera video 503. Acquisition unit 110 also acquires background image 501 in which no subject is captured. Camera video 503 is captured in the same space as that in which shooting target in which background image 501 is captured. That is, camera video 503 is captured by the camera with a position, a posture, an angle of view, a focal length, and a white balance that are identical to those when background image 501 is captured by the camera. In other words, the camera is identical in parameters (external parameters and internal parameters) between when camera video 503 is captured and when background image 501 is captured. Acquisition unit 110 may be implemented by a camera provided in image processing device 100, or may be implemented by a communication interface provided in image processing device 100.

Acquisition unit 110 may acquire a moving image including the subject as camera video 503. When the moving image is acquired, the processing on an image including the subject is performed for each frame included in the moving image.

Generator 120 is implemented by cooperation between a central processing unit (CPU) or a graphical processing unit (GPU) mounted on a PC or a camera and a memory, for example, and generates background removed image 506 obtained by removing a background region not including the subject in the image from camera video 503 acquired by the acquisition unit. Specifically, generator 120 extracts subject region 504a including the subject in camera video 503. Although subject region 504a is illustrated as a rectangular region, for example, it may be a region having another shape such as a circular shape or an elliptical shape. Processing of extracting subject region 504a is performed in which processing of recognizing the subject using a machine learning model is preformed, for example. The machine learning model is obtained by machine learning using a data set obtained by synthesizing an image group including an image in which a person (or an object) as a subject is reflected and correct data indicating a region in which the subject is reflected in each image of the image group. Processing of extracting subject region 504a may use deep learning. In this case, a network of object detection (subject detection) may be used, or a network of segmentation may be used.

Subject region 504a may be slightly larger than a subject region that is actually recognized.

Next, generator 120 cuts out subject region 504a from camera video 503 to generate a subject image. Generator 120 extracts background region 504b, which is a region other than subject region 504a, from camera video 503 to generate background mask image 505 in which a plurality of pixels constituting background region 504b is substantially equal in pixel value. Then, a boundary between background region 504b and subject region 504a may be set overlapping a block boundary of a block that is a processing unit of compression using compressor 130. As described above, subject detection result 504 of camera video 503 (an example of an image including the subject) includes subject region 504a including the subject and background region 504b not including the subject.

Generator 120 generates background removed image 506 by superimposing the subject image (subject region 504a) on subject region 505a of background mask image 505. Thus, the plurality of pixels constituting background region 506b of background removed image 506 has substantially the same pixel value. As described above, background removed image 506 generated by generator 120 is an image after the background region is changed to an image in which a compression ratio during compression is higher than that of a region including the subject in camera video 503. For example, each of the plurality of pixels may have a pixel value of 0 in a range from 0 to 255. One example may have substantially the same pixel value within a range from 0 to 10 in the range from 0 to 255. The plurality of pixels in another example may have pixel values within a predetermined range. Even when a pixel value within the predetermined range exists in subject region 506a in this case, a pixel having a pixel value within the predetermined range is not erroneously identified as background region 506b because subject region 504a is determined in advance. Subject region 506a of background removed image 506 coincides with subject region 504a cut out from camera video 503. Generator 120 is an example of the first generator.

The background removed image may be a subject image including only a subject region. The subject image may include information (or information indicating a position of the background region in the image) indicating a position of the subject region in the image.

Compressor 130 is implemented by cooperation between a CPU or a GPU and a memory, for example, which are mounted on a PC or a camera, and compresses (encodes) background removed image 506 to a first amount of data. The first amount of data may be a predetermined fixed amount of data or a variable amount of data determined in accordance with a communicable band of network 400. More specifically, compressor 130 compresses background removed image 506 with background region 506b having a higher compression ratio than subject region 506a of background removed image 506. That is, generator 120 generates background mask image 505 with background region 506b having a higher compression ratio than subject region 506a during compression of background removed image 506. Compressor 130 also may compress background image 501 to have a second amount of data larger than the first amount of data to generate transmission background image 502. That is, compressor 130 may compress background image 501 at a compression ratio smaller than the compression ratio of background removed image 506. Compressor 130 may generate transmission background image 502 without compressing background image 501. Transmission background image 502 in this case is an uncompressed image and coincides with background image 501.

Communicator 140 transmits and receives data to and from server 200 or display device 300 via network 400. Specifically, communicator 140 transmits the background removed image compressed to server 200 via network 400. Communicator 140 also transmits transmission background image 502 to server 200 via network 400.

Communicator 140 is implemented by communication IF for communicating with a gateway connected to network 400. Communicator 140 may perform communication by wired communication or wireless communication. Communicator 140 is an example of the transmitter.

Figure 4:
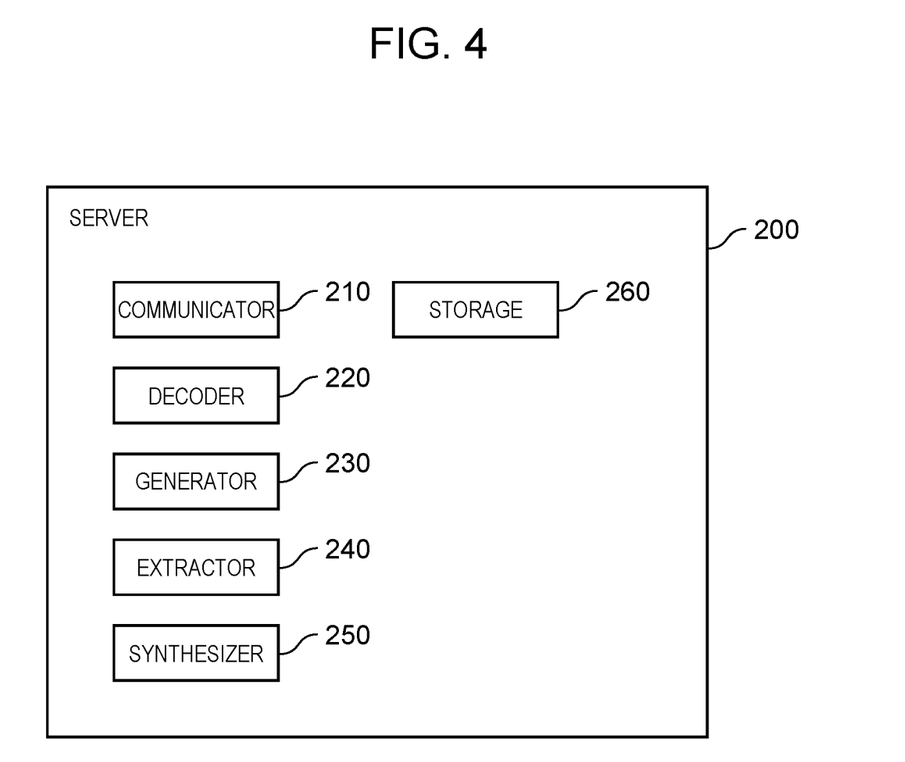
FIG. 4 is a diagram for illustrating processing in an image processing device according to an exemplary embodiment.
Figure 5:
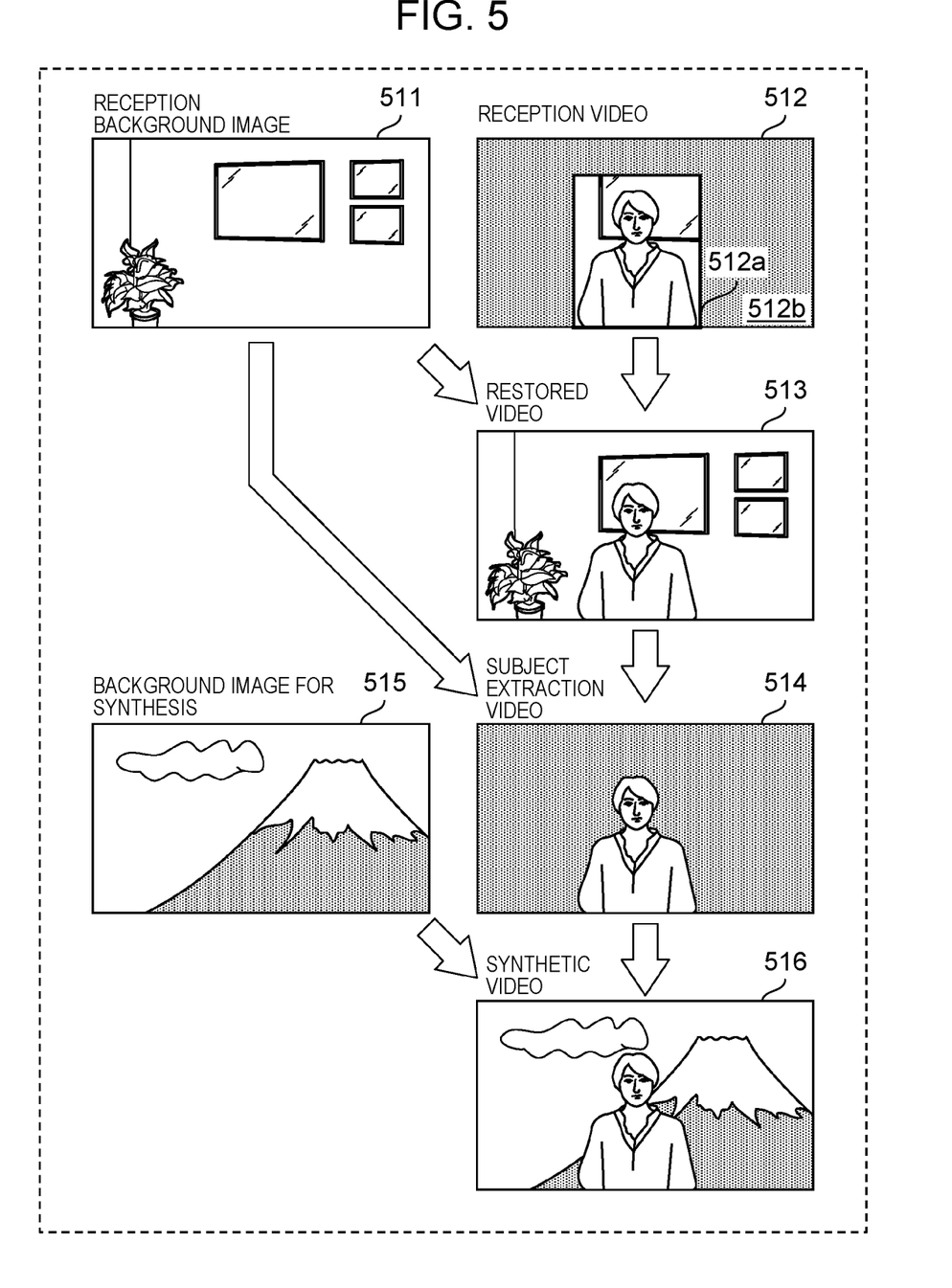
FIG. 5 is a diagram illustrating an example of a functional configuration of a display device according to an exemplary embodiment.

FIG. 4 is a diagram illustrating an example of a functional configuration of the server according to the exemplary embodiment. FIG. 5 is a diagram for illustrating processing in the server.

Server 200 includes communicator 210, decoder 220, generator 230, extractor 240, synthesizer 250, and storage 260. Functions of server 200 can be implemented by a processor executing a predetermined program using a memory. Each component will be described below.

Communicator 210 transmits and receives data to and from the image processing device 100 or display device 300 via network 400. Specifically, communicator 210 receives reception video 512, which is a background removed image compressed, via network 400. Communicator 210 also receives a background image (reception background image 511) from image processing device 100. Reception background image 511 coincides with transmission background image 502. Communicator 210 may transmit synthetic video 516 generated by synthesizer 250 to display device 300 via network 400. Communicator 210 is implemented by communication IF for communicating with a gateway connected to network 400. Communicator 210 may perform communication by wired communication or wireless communication. Communicator 210 is an example of the receiver.

Decoder 220 decodes reception video 512 received. As a result, a background removed image is obtained. Decoder 220 may decode only subject region 512a in reception video 512, or may decode the whole video including background region 512b. Decoder 220 can specify subject region 512a by referring to pixel values assigned to background region 512b of the background removed image.

Generator 230 synthesizes the background removed image obtained by the decoding and reception background image 511 to generate restored video 513 (restored image). Specifically, generator 230 extracts subject region 512a from the background removed image to generate restored video 513 by superimposing subject region 512a on a region corresponding to subject region 512a in reception background image 511. Generator 230 is an example of the second generator.

Extractor 240 compares restored video 513 with reception background image 511 to extract the subject. As a result, subject extraction video 514 is obtained. For example, extractor 240 may generate subject extraction video 514 from restored video 513 by comparing restored video 513 with reception background image 511 and extracting a region in which a difference in pixel values is larger than a predetermined difference. For example, extractor 240 also may extract subject extraction video 514 by comparing restored video 513 with reception background image 511 and removing a region, in which a difference in pixel values is smaller than the predetermined difference, from restored video 513.

Extractor 240 may extract the subject by comparing subject region 512a in reception video 512 with a region corresponding to subject region 512a in reception background image 511.

Synthesizer 250 generates synthetic video 516 (synthetic image) by superimposing subject extraction video 514 extracted on any background image (background image for synthesis 515) different from reception background image 511.

Synthesizer 250 may superimpose subject extraction video 514 on a specific position in background image for synthesis 515, or may superimpose subject extraction video 514 at a position designated by a user in background image for synthesis 515.

Storage 260 stores reception background image 511 received by communicator 210. Storage 260 may store background image for synthesis 515. Storage 260 is implemented by a hard disk drive (HDD), or a solid state drive (SSD), for example.

Figure 6:
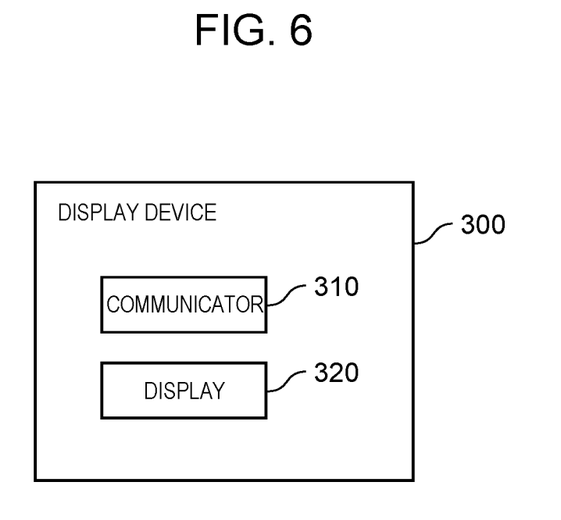
FIG. 6 is a diagram for illustrating processing in a server according to an exemplary embodiment.

FIG. 6 is a diagram illustrating an example of a functional configuration of a display device according to the exemplary embodiment.

Display device 300 includes communicator 310 and display 320. Functions of display device 300 can be implemented by a processor executing a predetermined program using a memory. Each component will be described below.

Communicator 310 transmits and receives data to and from the image processing device 100 or server 200 via network 400. Specifically, communicator 310 receives synthetic video 516 via network 400. Communicator 310 is implemented by communication IF for communicating with a gateway connected to network 400. Communicator 310 may perform communication by wired communication or wireless communication.

Display 320 displays synthetic video 516 received by communicator 310. Display 320 can be implemented by a display, for example.

Processing of image processing system 1 maybe sequentially (in real time) performed every time each frame included in camera video 503 as a moving image is captured, and synthetic video 516 may be distributed by live streaming. Synthetic video 516 also may be stored in storage 260 of server 200. Display device 300 may transmit a reproduction request of synthetic video 516 stored in storage 260 of server 200 in response to an instruction from the user, and reproduce (display) synthetic video 516 distributed from server 200.

2. Operation

Figure 7:
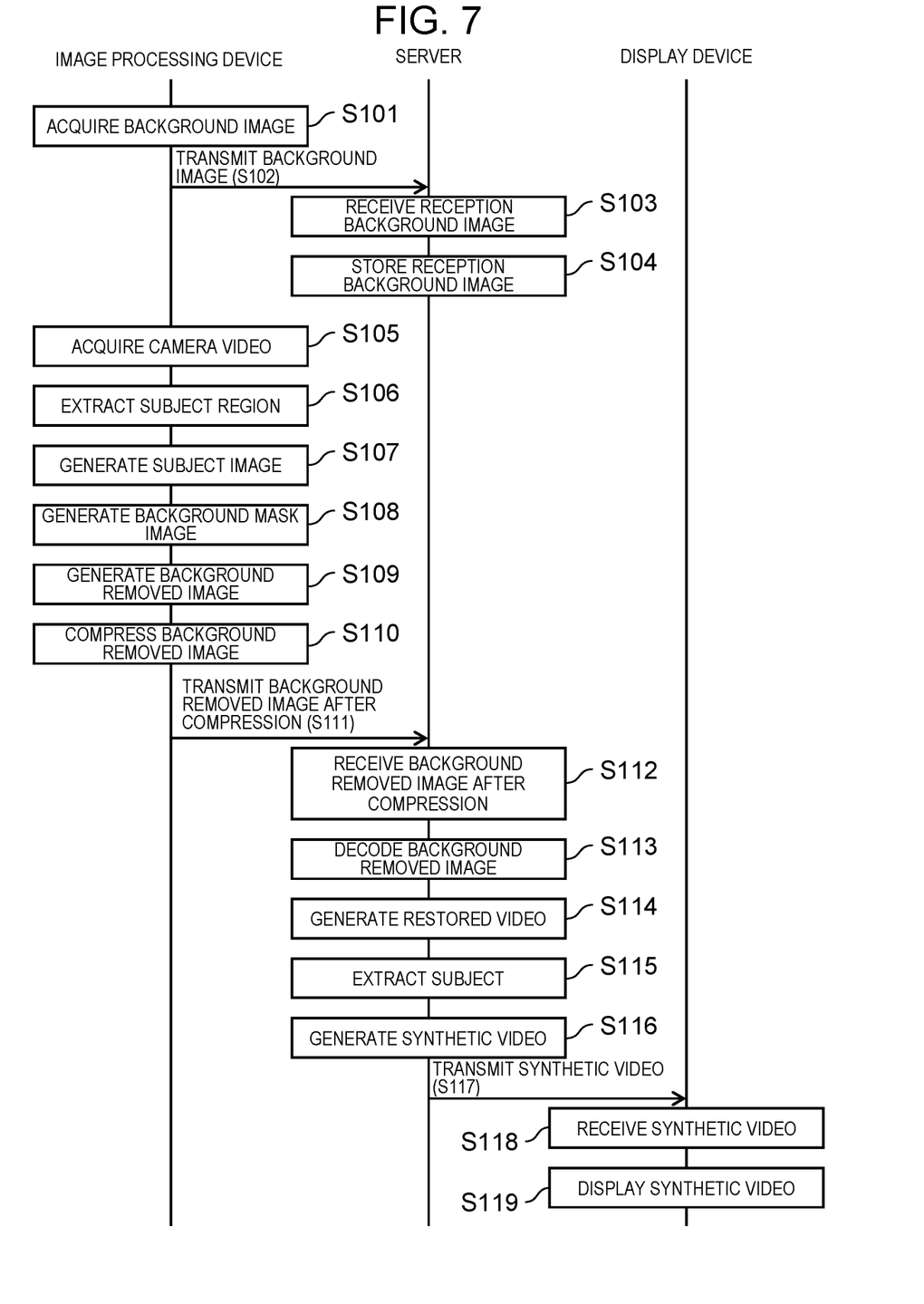
FIG. 7 is a sequence diagram illustrating an example of operation of an image processing system according to an exemplary embodiment.

FIG. 7 is a sequence diagram illustrating an example of operation of an image processing system according to the exemplary embodiment.

First, image processing device 100 acquires background image (S101).

Next, image processing device 100 transmits transmission background image 502 to server 200 via network 400 (S102).

Server 200 receives transmission background image 502 (reception background image 511) (S103).

Next, server 200 stores reception background image 511 received in storage 260 (S104).

Image processing device 100 acquires camera video 503 that is an image including a subject (S105).

Next, image processing device 100 extracts subject region 504a including the subject in camera video 503 (S106).

Subsequently, image processing device 100 cuts out subject region 504a from camera video 503 to generate a subject image (S107).

Subsequently, image processing device 100 extracts background region 504b, which is a region other than subject region 504a, from camera video 503, and generates background mask image 505 in which a plurality of pixels constituting background region 504b is substantially equal in pixel value (S108).

Subsequently, image processing device 100 generates background removed image 506 by superimposing the subject image (subject region 504a) on subject region 505a of background mask image 505 (S109).

Subsequently, image processing device 100 compresses background removed image 506 to have the first amount of data (S110).

Subsequently, image processing device 100 transmits the background removed image compressed to server 200 via network 400 (S111).

Server 200 receives reception video 512, which is the background removed image compressed, via network 400 (S112).

Subsequently, server 200 decodes reception video 512 received to generate background removed image (S113).

Subsequently, server 200 synthesizes the background removed image obtained by the decoding and reception background image 511 to generate restored video 513 (restored image) (S114).

Subsequently, server 200 compares restored video 513 with reception background image 511 to extract the subject, and generates subject extraction video 514 (S115).

Subsequently, server 200 generates synthetic video 516 (synthetic image) by superimposing subject extraction video 514 extracted on any background image (background image for synthesis 515) different from reception background image 511 (S116).

Subsequently, server 200 transmits synthetic video 516 generated to display device 300 via network 400 (S117).

Display device 300 receives synthetic video 516 via network 400 (S118).

Subsequently, display device 300 displays synthetic video 516 received (S119).

3. Effects and the Like

As described above, image processing system 1 according to the present exemplary embodiment extracts a subject from camera video 503, which is an image including the subject, using background image 501. Image processing system 1 includes image processing device 100 and server 200 that are connected to each other via network 400. Image processing device 100 includes generator 120, compressor 130, and communicator 140. Generator 120 generates background removed image 506 obtained by removing, from the image, a background region not including the subject in the image. Compressor 130 compresses background removed image 506. Communicator 140 transmits the background removed image compressed via network 400. Server 200 includes communicator 210, decoder 220, generator 230, and extractor 240. Communicator 210 receives the background removed image compressed via network 400. Decoder 220 decodes the background removed image compressed and received. Generator 230 synthesizes the decoded background removed image and reception background image 511 to generate restored video 513. Extractor 240 compares restored video 513 with reception background image 511 to extract the subject.

This configuration generates background removed image 506 in which the background region other than the subject is removed from camera video 503, and compresses background removed image 506. Thus, the amount of data (the amount of code) occupied by a subject region can be increased in proportion in the background removed image compressed. As a result, the amount of data on background removed image 506 compressed can be reduced almost without reducing the image quality of the subject region transmitted via network 400. Thus, deterioration in image quality of the image of the subject extracted at the transmission destination can be suppressed.

Then, the plurality of pixels constituting background region 506b of background removed image 506 has substantially the same pixel value. Thus, the amount of data (the amount of code) on the background region of the background removed image can be reduced.

When background removed image 506 is generated, subject region 504a including the subject in camera video 503 is extracted, and subject region 504a is cut out from camera video 503 to generate a subject image. When background removed image 506 is generated, background region 504b, which is a region other than the subject region, is next extracted from camera video 503, and background mask image 505, in which a plurality of pixels constituting background region 504b is substantially equal in pixel value, is generated. Then, when background removed image 506 is generated, the subject image (subject region 504a) is superimposed on subject region 505a in background mask image 505 to generate background removed image 506. Thus, background removed image 506 can be easily generated.

Camera video 503 is a moving image. The image processing method includes generation and compression of background removed image 506, transmission of background removed image 506 compressed, reception and decoding of background removed image 506 compressed, generation of restored video 513, and extraction of the subject, which are performed for each frame included in the moving image. Thus, deterioration in image quality of the image of the subject extracted for each frame of the moving image by the device (or server 200) at the transmission destination can be suppressed.

Transmission background image 502 is an uncompressed image or has a smaller compression ratio than background removed image 506 compressed. Thus, the background image can have high quality.

Then, a boundary between background region 504b and subject region 504a is set overlapping a block boundary of a block that is a processing unit of compression using compressor 130. Thus, background removed image 506 can be efficiently compressed.

4. Modifications

Although image processing system 1 according to the above exemplary embodiment performs processing of extracting a subject using a background image captured by a camera fixed and a camera video, the present invention is not limited thereto. For example, the background image may include a plurality of background images captured in advance for each attitude by panning the camera in a limited angle range, and the camera video may be captured while the camera is panned in the limited angle range. In this case, each background image is stored in storage 260 of server 200 in association with the attitude of the camera, and server 200 receives the camera video from image processing device 100 together with attitude information indicating the attitude of the camera for each frame. Server 200 may perform processing of specifying the background image associated with the attitude information for each frame and extracting the subject using the reception video generated by the frame, and the background image.

Although the above description shows server 200 that performs storing camera parameters related to respective attitudes of the camera and background images obtained under the corresponding camera parameters, the camera parameters and the background images being associated with each other, while changing the camera parameters, specifying one of the background images for each frame corresponding to the camera parameters under which the frame is obtained, and extracting the subject using the frame and the specified background image, but the present invention is not limited thereto. The same can apply to when camera parameters other than the attitudes of the camera are changed.

Although the image processing system and the like according to the exemplary embodiment of the present disclosure have been described above, the present disclosure is not limited to this exemplary embodiment.

Then, each of processors included in the image processing system, the image processing device, the server, the display device, and the like according to the exemplary embodiment above is typically implemented as an LSI that is an integrated circuit. These processors may be individually integrated into one chip, or some or all of the processors may be integrated into one chip.

The circuit integration is not limited to the LSI, and may be implemented by a dedicated circuit or a general-purpose processor. The circuit integration may be implemented using a field programmable gate array (FPGA) that can be programmed after manufacturing of an LSI or a reconfigurable processor in which connections and settings of circuit cells inside an LSI can be reconfigured.

Each exemplary embodiment above may allow each of components to be implemented by dedicated hardware or by execution of a software program suitable for corresponding one of the components. Each of the components may be implemented by a program executor such as a CPU or a processor reading and executing a software program recorded in a recording medium such as a hard disk or semiconductor memory.

The present disclosure also may be implemented as a video transmission method, a transmission method, a display method, and the like performed by an image processing system, an image processing device, a server, a display device, and the like.

The division of the functional blocks in the block diagram is an example, and a plurality of functional blocks may be implemented as one functional block, one functional block may be divided into a plurality of functional blocks, or some functions may be transferred to another functional block. Then, functions of a plurality of functional blocks having similar functions may be processed in parallel or in a time division manner by single hardware or software.

The flowchart shows each of steps being performed in order for specifically illustrating the present disclosure, and thus each step may be performed in order other than the above. Alternatively, some of the steps above may be performed simultaneously (in parallel) with another step.

Although the image processing system, the image processing device, the server, the display device, and the like according to one or more aspects have been described above based on the exemplary embodiment, the present disclosure is not limited to this exemplary embodiment. Configurations in which various modifications conceivable by those skilled in the art are applied to the present exemplary embodiment and configurations constructed by combining components in different exemplary embodiments may also be included in the scope of one or more aspects without departing from the gist of the present disclosure.

The present disclosure is applicable to an image processing system or the like capable of suppressing deterioration of an image of a subject due to compression.

What is claimed is:

1. An image processing method for extracting a subject from an image including the subject using a background image, the image processing method comprising:
   generating a background removed image obtained by removing, from the image, a background region not including the subject in the image;
   compressing the background removed image;
   transmitting the background removed image compressed via a network;
   receiving the background removed image compressed via the network;
   decoding the background removed image compressed and received;
   generating a restored image by synthesizing the background removed image decoded and the background image; and
   comparing the restored image with the background image to extract the subject.

2. The image processing method according to claim 1, wherein;
   the image includes the background region and a subject region including the subject, and
   the background removed image is compressed with the background region having a higher compression ratio than the subject region.

3. The image processing method according to claim 2, wherein the generating the background removed image includes:
   extracting the subject region from the image,
   cutting out the subject region from the image, to generate a subject image,
   extracting the background region from the image,
   generating a background mask image with the background region having a higher compression ratio than the subject region, and
   superimposing the subject image on the subject region of the background mask image, to generate the background removed image.

4. The image processing method according to claim 1, wherein;
   the image is one of a plurality of frames included in a moving image, and
   the image processing method is performed for operations for each of the plurality of frames included in the moving image, the operations including the generating, the compressing, the transmitting, the receiving, and the decoding the background removed image, the generating the restored image, and the extracting the subject.

5. The image processing method according to claim 1, wherein the background image is an uncompressed image or has a smaller compression ratio than the background removed image compressed.

6. The image processing method according to claim 1, wherein the background image not including the subject is received via the network before the background removed image is generated.

7. The image processing method according to claim 1, wherein;
the image processing method is performed by an image processing system including an image processing device and a server that are communicably connected to each other via a network,
the image processing device performs the generating, the compressing, and the transmitting the background removed image, and
the server performs the receiving, and the decoding the background removed image, the generating the restored image, and the extracting the subject.

8. The image processing method according to claim 3, wherein a boundary between the background region and the subject region is set overlapping a block boundary of a block that is a processing unit in the compressing.

9. The image processing method according to claim 2, wherein the background region of the background removed image is constituted of a plurality of pixels that is substantially equal in pixel value.

10. An image processing system configured to extract a subject from an image including the subject using a background image, the image processing system comprising:
an image processing device and a server that are connected to each other via a network,
wherein the image processing device includes:
a first generator that generates a background removed image obtained by removing, from the image, a background region not including the subject in the image;
a compressor that compresses the background removed image; and
a transmitter that transmits the background removed image compressed via the network, and
wherein the server includes:
a receiver that receives the background removed image compressed via the network;
a decoder that decodes the background removed image compressed and received;
a second generator that synthesizes the background removed image decoded and the background image to generate a restored image; and
an extractor that compares the restored image with the background image to extract the subject.

11. An image processing method performed by a server in an image processing system that includes an image processing device that transmits a compressed image including a subject, and the server that extracts the subject from the compressed image using a background image, the image processing method comprising:
receiving a background removed image compressed via a network;
decoding the background removed image compressed and received;
synthesizing the background removed image decoded and the background image to generate a restored image; and
comparing the restored image with the background image to extract the subject, the background removed image compressed being obtained by compressing a background removed image obtained by removing, from the image, a background region not including the subject in the image.

12. A server provided in an image processing system that includes an image processing device that transmits a compressed image including a subject, and the server that extracts the subject from the compressed image using a background image, the server comprising:
a receiver that receives a background removed image compressed via a network;
a decoder that decodes the background removed image compressed and received;
a generator that synthesizes the background removed image decoded and the background image to generate a restored image; and
an extractor that compares the restored image with the background image to extract the subject, the background removed image compressed being obtained by compressing a background removed image obtained by removing, from the image, a background region not including the subject in the image.

* * * * *